United States Patent [19]

Suzuki

[11] Patent Number: 5,585,966
[45] Date of Patent: Dec. 17, 1996

[54] ZOOM LENS WITH VIBRATION REDUCTION FUNCTION

[75] Inventor: Kenzaburo Suzuki, Tokyo, Japan

[73] Assignee: Nikon Corporation, Tokyo, Japan

[21] Appl. No.: 363,340

[22] Filed: Dec. 23, 1994

[30] Foreign Application Priority Data

Dec. 28, 1993 [JP] Japan .................................. 5-353456

[51] Int. Cl.$^6$ .............................. G02B 27/64; G02B 15/14
[52] U.S. Cl. ........................... 359/557; 359/554; 359/687
[58] Field of Search .................................. 359/554–557, 359/676, 677, 683, 686, 687, 738–740

[56] References Cited

U.S. PATENT DOCUMENTS

| | | | |
|---|---|---|---|
| 4,859,042 | 8/1989 | Tanaka | 359/687 |
| 5,009,492 | 4/1991 | Hamano | 359/687 |
| 5,121,978 | 6/1992 | Maruyama | 359/557 |
| 5,189,558 | 2/1993 | Ishii et al. | 359/687 |
| 5,249,079 | 9/1993 | Umeda | 359/557 |

FOREIGN PATENT DOCUMENTS

| | | |
|---|---|---|
| 1-189621 | 7/1989 | Japan . |
| 1-191113 | 8/1989 | Japan . |
| 1-284823 | 11/1989 | Japan . |

*Primary Examiner*—Thong Nguyen
*Attorney, Agent, or Firm*—Shapiro and Shapiro

[57] ABSTRACT

A zoom lens includes, in the following order from the object side, a first lens group having a positive refracting power, a second lens group having a negative refracting power, a third lens group having a positive refracting power, and a fourth lens group having a positive refracting power, and also includes a vibration reduction mechanism for attaining vibration reduction by shifting the third lens group or a partial lens group in the third lens group in a direction substantially perpendicular to an optical axis. When zooming is effected from the wide-angle end to the telephoto end, the interval between the first and second lens groups increases, the interval between the second and third lens groups decreases, and the interval between the third and fourth lens groups changes. The zoom lens satisfies the following condition:

$$0.2 < f3/(fW \cdot fT)^{1/2} < 2$$

where fW is the focal length of the entire lens system at the wide-angle end, fT is the focal length of the entire lens system at the telephoto end, and f3 is the focal length of the third lens group.

1 Claim, 6 Drawing Sheets

ZOOM LENS WITH VIBRATION REDUCTION FUNCTION

BACKGROUND OF THE INVENTION

1. Field of the Invention

The present invention relates to a zoom lens with a vibration reduction function and, more particularly, to a vibration reduction method for zoom lenses for a still camera, video camera, and the like.

2. Related Background Art

A conventional zoom lens with a vibration reduction function corrects a variation in image position caused by, e.g., a camera shake by shifting an arbitrary lens group in the zoom lens constituted by two or more lens groups in a direction substantially perpendicular to the optical axis, as described in Japanese Laid-Open Patent Application Nos. 1-189621 and 1-191113. Also, another zoom lens with a vibration reduction function corrects a variation in image position caused by, e.g., a camera shake by shifting a partial lens group in a fixed first lens group upon zooming (variable magnification) in a direction substantially perpendicular to the optical axis, as described in Japanese Laid-Open Patent Application No. 1-284823.

Note that correcting a variation in image position caused by, e.g., a camera shake by shifting the lens group in a direction substantially perpendicular to the optical axis will be referred to as "vibration reduction" in this specification.

However, the above-mentioned zoom lenses are not suitable for a lens for a still camera or a video camera since a sufficient back focus cannot be assured and a large zoom ratio cannot be realized for a lens for a single-lens reflex camera or a lens for a video camera.

Since vibration reduction is achieved using a movable lens group upon zooming (variable magnification) or a largest one of lens groups constituting the zoom lens, mechanisms undesirably become bulky and complicated.

SUMMARY OF THE INVENTION

The present invention has been made in consideration of the above situation and has as an object to provide a compact, high-performance zoom lens for a still camera or a video camera.

In order to achieve the above object, according to the present invention, a zoom lens, which comprises, in the following order from the object side, a first lens group G1 having a positive refracting power, a second lens group G2 having a negative refracting power, a third lens group G3 having a positive refracting power, and a fourth lens group G4 having a positive refracting power, and in which when zooming is effected from the wide-angle end to the telephoto end, the interval between the first and second lens groups G1 and G2 increases, the interval between the second and third lens groups G2 and G3 decreases, and the interval between the third and fourth lens groups G3 and G4 changes, comprises displacement means for attaining vibration reduction by shifting the third lens group G3 or a partial lens group in the third lens group in a direction substantially perpendicular to the optical axis, and satisfies the following condition:

$$0.2 < f_3/(f_W \cdot f_T)^{1/2} < 1.2$$

where $f_W$ is the focal length of the entire lens system at the wide-angle end, $f_T$ is the focal length of the entire lens system at the telephoto end, and $f_3$ is the focal length of the third lens group G3.

According to a preferred aspect of the present invention, the zoom lens satisfies the following condition:

$$0.4 < f_3/f_4 < 1.2$$

where $f_4$ is the focal length of the fourth lens group G4.

The third lens group G3 is fixed along the optical axis during zooming, and preferably comprises, on the optical axis, a stationary flare stop for shielding unnecessary rays when the third lens group G3 shifts in the direction substantially perpendicular to the optical axis for vibration reduction.

The zoom lens of the present invention adopts the following arrangement to be suitable for a zoom lens for a still camera or a video camera. That is, the zoom lens comprises, in the following order from the object side, a first lens group G1 having a positive refracting power, a second lens group G2 having a negative refracting power, a third lens group G3 having a positive refracting power, and a fourth lens group G4 having a positive refracting power, and when zooming is effected from the wide-angle end to the telephoto end, the interval between the first and second lens groups G1 and G2 increases, the interval between the second and third lens groups G2 and G3 decreases, and the interval between the third and fourth lens groups G3 and G4 changes.

The characteristic features of the zoom lens with the above arrangement reside in that:

i) good imaging performance can be obtained at respective focal lengths; and ii) a nigh zoom ratio can be attained since the second, third, and fourth lens groups G2, G3, and G4 can contribute to zooming.

With these excellent characteristics, the zoom lens with the above arrangement is widely used as zoom lenses for still cameras and video cameras.

The present invention provides optimal conditions for attaining vibration reduction while assuring good imaging performance for a zoom lens of this type.

DETAILED DESCRIPTION OF THE PREFERRED EMBODIMENTS

In general, in a zoom lens which includes a positive lens group at the most object side (that is, closest to the object side), a first lens group G1 at the most object side is the largest in size, and is normally extended toward the object side upon focusing. For this reason, when the first lens group G1 is selected as a correction optical system which is displaced in a direction perpendicular to the optical axis for vibration reduction, the holding and driving mechanisms are undesirably complicated and become bulky. Therefore, in the zoom lens of the present invention, it is not preferable to select the first lens group G1 as a vibration reduction optical system.

In the zoom lens having the arrangement of the present invention, the fourth lens group G4 has a large total length (the distance from the surface at the most object side to the surface at the most image side along the optical axis). When such a lens group is selected as a vibration reduction optical system, the holding and driving mechanisms are undesirably complicated and become bulky. Therefore, in the zoom lens of the present invention, it is not preferable to select the fourth lens group G4 as a vibration reduction optical system.

In the zoom lens having the arrangement of the present invention, the lens arrangement of the third lens group G3 is relatively simple, and the shift amount, in the optical axis direction, of the third lens group G3 upon zooming can be decreased, or the third lens group G3 can be even fixed during zooming.

For these reasons, according to the present invention, in order to simplify the mechanism (holding and driving mechanisms) of the entire lens system and to assure good imaging performance upon vibration reduction, displacement means for attaining vibration reduction is arranged in the third lens group G3. More specifically, vibration reduction is achieved by shifting the third lens group G3 or its partial lens group in a direction substantially perpendicular to the optical axis.

According to the present invention, in addition to the above-mentioned arrangement, the zoom lens satisfies the following conditional formula (1):

$$0.2 < f3/(fW \cdot fT)^{1/2} < 2 \quad (1)$$

where fW: the focal length of the entire lens system at the wide-angle end
fT: the focal length of the entire lens system at the telephoto end
f3: the focal length of the third lens group G3

Conditional formula (1) defines an appropriate range in association with the focal length fW of the zoom lens at the wide-angle end, the focal length fT of the zoom lens at the telephoto end, and the focal length f3 of the third lens group G3.

When the ratio of these focal lengths is set to be smaller than the lower limit value of conditional formula (1), the back focus becomes too short to assure a sufficient back focus. Also, the spherical aberration at the telephoto end becomes excessive in the negative direction, and a variation in coma upon zooming tends to be large.

On the contrary, when the ratio of these focal lengths exceeds the upper limit value of conditional formula (1), the focal length f3 of the third lens group G3 becomes too large, the spherical aberration at the telephoto end tends to become excessive in the positive direction, and the total length of the zoom lens becomes too large, thus disturbing a compact structure.

Note that the imaging performance can be further improved by setting the upper limit value of conditional formula (1) to be 1.3 or less, and its lower limit value to be 0.4 or more.

In order to further improve the imaging performance, the zoom lens preferably satisfies the following conditional formula (2) in addition to the above-mentioned condition:

$$0.4 < f3/f4 < 1.2 \quad (2)$$

where f3: the focal length of the third lens group G3
f4: the focal length of the fourth lens group G4

Conditional formula (2) defines an appropriate refracting power ratio between the focal length f3 of the third lens group G3 and the focal length f4 of the fourth lens group G4.

When the ratio is set to be smaller than the lower limit value of conditional formula (2), the spherical aberration at the telephoto end becomes excessive in the negative direction, and the total length increases, thus disturbing a compact structure. In addition, since the Petzval sum tends to become excessive in the positive direction, the astigmatism and the curvature of field increase.

On the contrary, when the ratio exceeds the upper limit value of conditional formula (2), the spherical aberration at the telephoto end tends to become excessive in the negative direction, a variation in coma upon zooming becomes large, and the distortion at the telephoto end tends to become excessive in the positive direction.

Note that the imaging performance can be further improved by setting the upper limit value of conditional formula (2) to be 1.0 or less, and its lower limit value to be 0.6 or more.

In order to further improve the imaging performance, the zoom lens preferably satisfies the following conditional formulas (3) to (5) in addition to the above-mentioned conditions:

$$\Delta S3/f3 < 0.1 \quad (3)$$

$$0.2 < R31/f3 < 2 \quad (4)$$

$$L/f3 < 0.4 \quad (5)$$

where $\Delta S3$: the maximum displacement amount, in a direction perpendicular to the optical axis, of the third lens group G3 upon vibration reduction
R31: the radius of curvature of the surface, at the most object side, of the third lens group G3
L: the on-axis thickness of the third lens group G3
Note that when the lens surface is an aspherical surface, R31 is the value of the reference radius of curvature.

Conditional formula (3) defines an appropriate range in association with the ratio between the maximum displacement amount of the third lens group G3 upon vibration reduction and the focal length f3 of the third lens group G3.

When the ratio exceeds the upper limit value of conditional formula (3), the maximum displacement amount of the third lens group G3 becomes too large, and the aberration variation amount upon vibration reduction tends to become large. In particular, at a peripheral position on the image plane, the difference, in the optical axis direction, between the best imaging plane in the meridional direction and the best imaging plane in the sagittal direction tends to increase.

In addition, such a ratio is not preferable since the mechanisms are complicated.

Conditional formula (4) defines an appropriate range in association with the ratio between the radius of curvature of the surface, at the most object side, of the third lens group G3 and the focal length f3 of the third lens group G3.

When the ratio falls outside the range (defined by the upper and lower limit values) of conditional formula (4), the spherical aberration at the telephoto end tends to become excessive in the negative direction, and a variation in coma upon zooming becomes large.

In addition, it becomes difficult to obtain good imaging performance upon vibration reduction.

Note that the imaging performance can be further improved by setting the upper limit value of conditional formula (4) to be 1.3 or less, and its lower limit value to be 0.7 or more.

Conditional formula (5) defines an appropriate range in association with the ratio between the on-axis thickness of the third lens group G3 and the focal length f3 of the third lens group G3.

When the ratio exceeds the upper limit value of conditional formula (5), the on-axis thickness of the third lens group G3 as a vibration reduction lens group becomes too large, and the mechanism for vibration reduction becomes bulky and complicated.

Upon constitution of an actual third lens group G3, in addition to the above-mentioned conditions, the zoom lens desirably satisfies the following conditional formulas (6) and (7):

$$1.52 < N+ \qquad (6)$$

$$45 < \nu+ \qquad (7)$$

where N+: the refractive index of a positive lens, at the most object side, of the third lens group G3

ν+: the Abbe's number of the positive lens, at the most object side, of the third lens group G3

When the refractive index is set to be smaller than the lower limit value of conditional formula (6), the spherical aberration at the telephoto end tends to become excessive in the negative direction. In addition, the Petzval sum tends to undesirably shift in the positive direction.

On the other hand, when the Abbe's number is set to be smaller than the lower limit value of conditional formula (7), a variation in on-axis chromatic aberration upon zooming becomes excessive.

In order to further improve the imaging performance, in addition to the above-mentioned conditions, the zoom lens preferably satisfies the following conditional formulas (8) to (10):

$$0.15 < |f2|/f1 < 0.5 \qquad (8)$$

$$-1 < q+ < 1 \qquad (9)$$

$$\Delta S3/D < 0.1 \qquad (10)$$

where f1: the focal length of the first lens group G1 f2: the focal length of the second lens group G2 q+: the shape factor of a positive lens, at the most object side, in the third lens group G3

D: the effective diameter of the surface, at the most object side, in the third lens group G3

Note that the shape factor q is given by the following equation (a) when the radius of curvature of the surface, at the object side, of a lens is represented by R1, and the radius of curvature of the surface, at the image side, of the lens is represented by R2:

$$q = (R2 + R1)/(R2 - R1) \qquad (a)$$

Conditional formula (8) defines an appropriate range in association with the ratio between the focal length of the second lens group G2 and that of the first lens group G1.

When the ratio exceeds the upper limit value of conditional formula (8), not only the spherical aberration at the telephoto end becomes large in the negative direction, but also a variation in coma upon zooming becomes large. In addition, the Petzval sum tends to undesirably shift in the positive direction.

On the contrary, when the ratio is set to be smaller than the lower limit value of conditional formula (8), the astigmatism at the wide-angle end becomes large, the distortion at both the wide-angle end and the telephoto end largely shifts in the negative direction, and the Petzval sum tends to shift in the negative direction. In addition, a large positive spherical aberration tends to be generated at the telephoto end.

Conditional formula (9) defines an appropriate range in association with the shape factor of the positive lens, at the most object side, in the third lens group G3.

When the shape factor falls outside the range of conditional formula (9), at both the wide-angle end and the telephoto end, a large negative spherical aberration tends to be generated.

In addition, upon zooming, a variation in coma of rays above the principal ray becomes large.

Conditional formula (10) defines an appropriate condition associated with the ratio between the maximum displacement $\Delta S3$, in a direction perpendicular to the optical axis, of the third lens group G3 upon vibration reduction, and the effective diameter D of the surface, at the most object side, in the third lens group G3.

When the ratio exceeds the upper limit value of conditional formula (10), the maximum displacement amount in the direction perpendicular to the optical axis upon vibration reduction becomes too large with respect to the effective diameter, and stray light tends to be mixed upon vibration reduction. By arranging a stationary flare stop on the optical axis, the mixing of stray light can be eliminated.

When the stationary flare stop is arranged on the optical axis in addition to an aperture stop, as described above, unnecessary light upon displacement of the lens group across the optical axis for vibration reduction can be shielded, and generation of a ghost and unnecessary exposure can be avoided.

When the third lens group G3 is constituted by a single lens (which can be a cemented lens consisting of plural lenses), the lens preferably has a biconvex lens shape.

Furthermore, when the third lens group G3 is constituted by a cemented lens of positive and negative lenses, the cemented surface is preferably a diverging surface having a convex surface facing the image side.

As will be described in a second embodiment to be described later, when the third lens group G3 includes an spherical surface, not only imaging performance can be further improved upon zooming and vibration reduction, but also the third lens group G3 as a vibration reduction lens group can be effectively rendered compact and lightweight.

Furthermore, in order to simplify the mechanism, the third lens group G3 is preferably fixed in a direction along the optical axis upon zooming.

In order to attain vibration reduction without changing image quality between the center of the frame and other portions, an aperture stop is preferably arranged in the vicinity of the third lens group G3.

Moreover, rear-focusing can be attained by shifting the fourth lens group G4 along the optical axis.

In each of the preferred embodiments of the present invention, a zoom lens with a vibration reduction function comprises, in the following order from the object side, a first lens group G1 having a positive refracting power, a second lens group G2 having a negative refracting power, a third lens group G3 having a positive refracting power, and a fourth lens group G4 having a positive refracting power. When zooming is effected from the wide-angle end to the telephoto end, the interval between the first and second lens groups G1 and G2 increases, the interval between the second and third lens groups G2 and G3 decreases, and the interval between the third and fourth lens groups G3 and G4 changes.

The preferred embodiments of the present invention will be described hereinafter with reference to the accompanying drawings. [First Embodiment]

Figure 1:
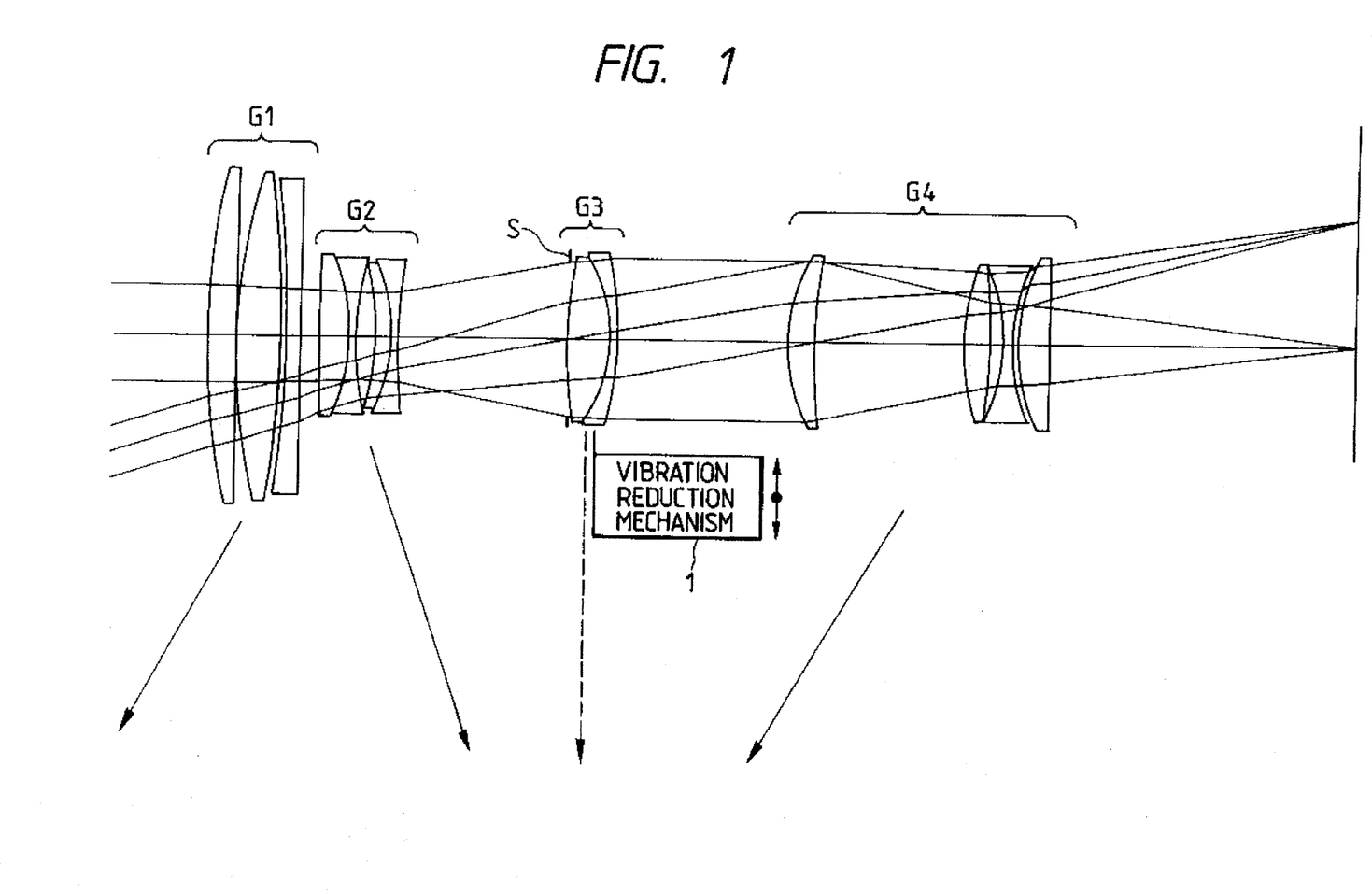
FIG. 1 is a view showing the arrangement of a zoom lens according to a first embodiment of the present invention.
Figure 2A:
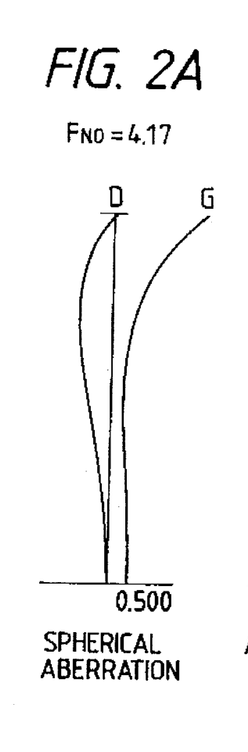
FIGS. 2A to 2E are graphs showing aberrations at the wide-angle end in the first embodiment shown in FIG. 1.
Figure 2B:
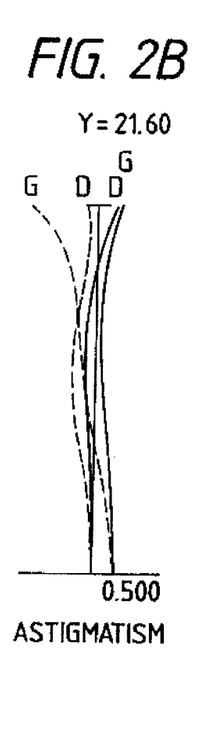
Figure 2C:
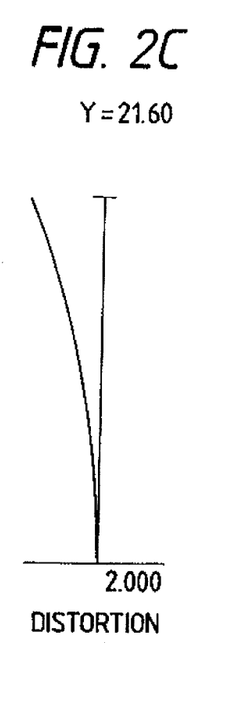
Figure 2D:
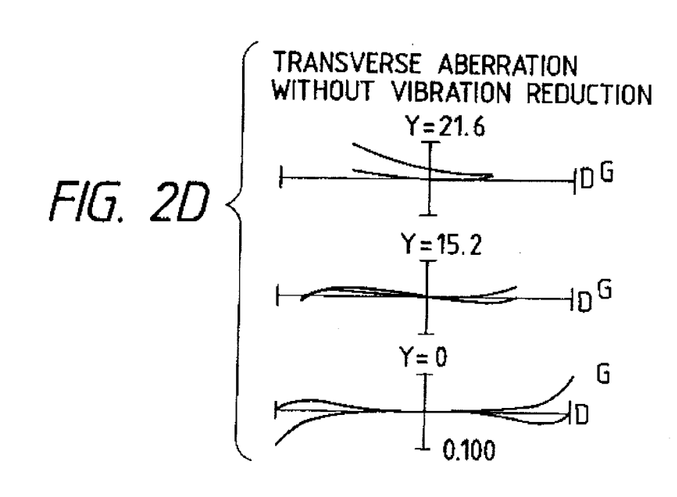
Figure 2E:
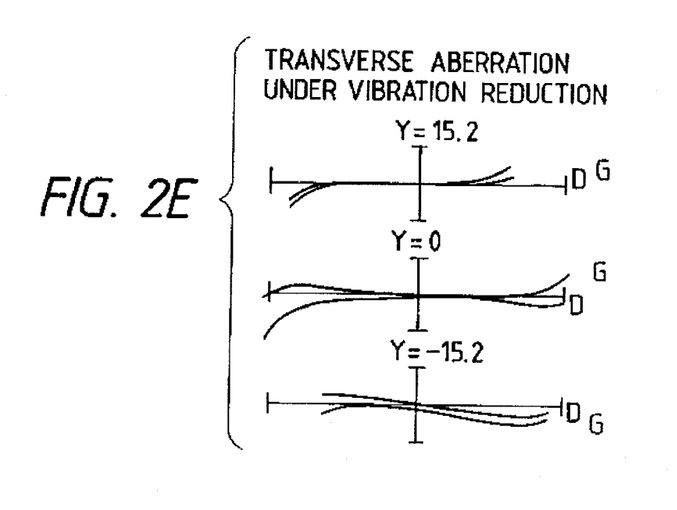
Figure 3A:
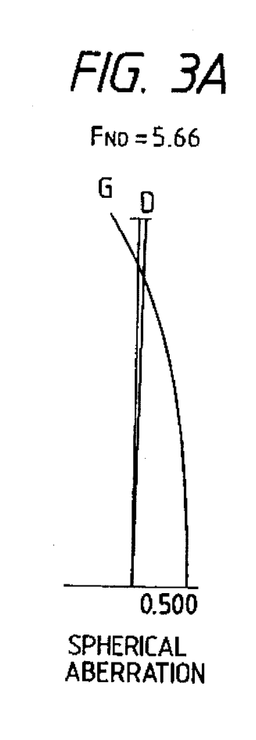
FIGS. 3A to 3E are graphs showing aberrations at the telephoto end in the first embodiment shown in FIG. 1.
Figures 3B, 3C:
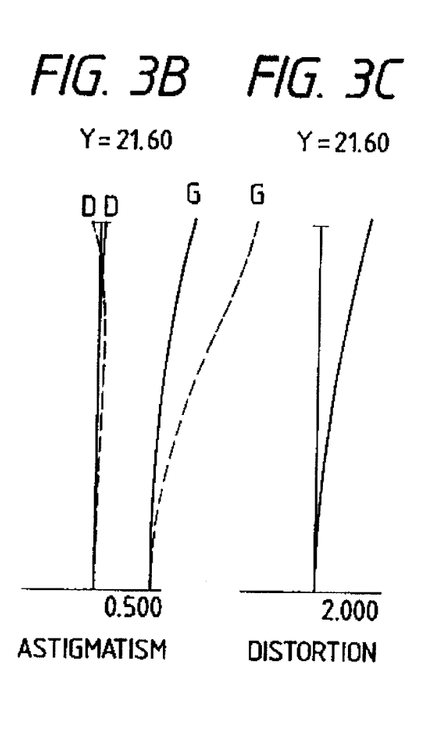
Figure 3D:
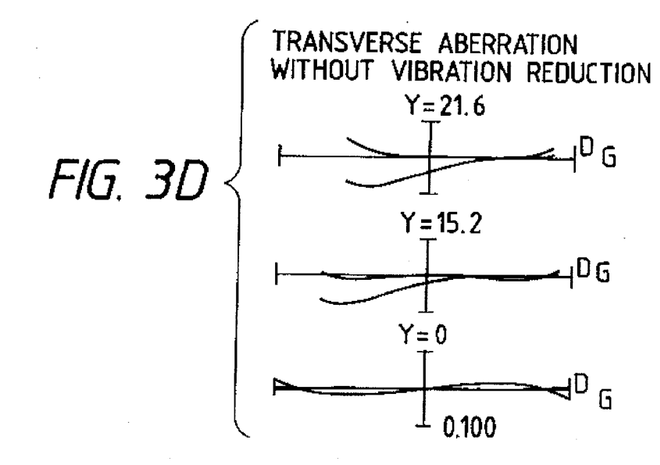
Figure 3E:
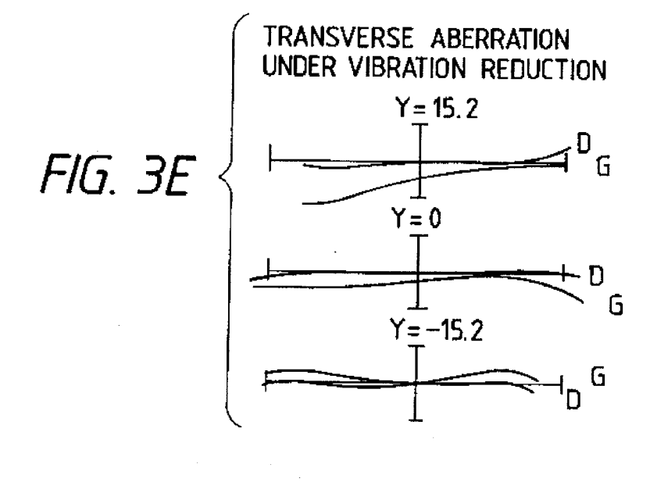

FIG. 1 is a view showing the arrangement of a zoom lens according to the first embodiment of the present invention. The zoom lens shown in FIG. 1 is constituted by, in the following order from the object side: a first lens group G1 consisting of a plano-convex lens having a convex surface facing the object side, a biconvex lens, and a negative meniscus lens having a concave surface facing the object side; a second lens group G2 consisting of a cemented lens comprising a biconvex lens and a biconcave lens, and a cemented lens comprising a positive meniscus lens having a concave surface facing the object side and a biconcave lens; a third lens group G3 consisting of a cemented lens comprising a biconvex lens and a negative meniscus lens having a concave surface facing the object side; and a fourth lens group G4 consisting of a positive meniscus lens having a convex surface facing the object side, a biconvex lens, a biconcave lens, and a biconvex lens.

Note that an aperture stop S is arranged between the second and third lens groups G2 and G3 and in the vicinity of the third lens group G3, as shown in FIG. 1.

FIG. 1 shows the positional relationship among the lens groups at the wide-angle end. Upon zooming toward the telephoto end, the lens groups shift along zoom paths indicated by arrows in FIG. 1. Note that the third lens group G3 is fixed along the optical axis during a zooming operation, and is appropriately moved by a vibration reduction mechanism 1 as displacement means in a direction substantially perpendicular to the optical axis, thereby correcting an image fluctuation caused by a vibration of the zoom lens.

In the first embodiment, the present invention is applied to a telephoto zoom lens for a still camera. Table 1 below summarizes data values of the first embodiment of the present invention. In Table 1, f is the focal length, $F_{NO}$ is the f-number, $2\omega$ is the field angle, and Bf is the back focus. Furthermore, numerals in the leftmost column represent the order of lens surfaces, r is the radius of curvature of each lens surface, d is the lens surface interval, n (D) and ν are respectively the refractive index and Abbe's number for the d-line ($\lambda$=587.6 nm), and n (G) is the refractive index for the g-line ($\lambda$=435.8 nm).

TABLE 1 f = 72.17 to 290.05
$F_{NO}$ = 4.17 to 5.66
$2\omega$ = 34.16° to 8.38°

|   | r | d | ν | n(D) | n(G) |
|---|---|---|---|---|---|
| 1 | 137.3059 | 4.9000 | 70.41 | 1.48749 | 1.49593 |
| 2 | ∞ | 0.1000 | | | |
| 3 | 110.7182 | 7.9300 | 82.52 | 1.49782 | 1.50527 |
| 4 | −152.3206 | 0.9800 | | | |
| 5 | −164.7363 | 2.5000 | 25.35 | 1.80518 | 1.84725 |
| 6 | −1185.6190 | (d6 = variable) | | | |
| 7 | 530.3661 | 4.8300 | 25.35 | 1.80518 | 1.84725 |
| 8 | −35.4781 | 1.5000 | 55.60 | 1.69680 | 1.71232 |
| 9 | 49.9005 | 3.4500 | | | |
| 10 | −43.1901 | 2.6600 | 29.46 | 1.71736 | 1.74922 |
| 11 | −30.1353 | 1.5000 | 49.68 | 1.77250 | 1.79193 |
| 12 | 212.1666 | (d12 = variable) | | | |
| 13 | 94.3757 | 6.9700 | 61.09 | 1.58913 | 1.60103 |
| 14 | −27.0236 | 1.5000 | 25.35 | 1.80518 | 1.84725 |
| 15 | −55.2273 | (d15 = variable) | | | |
| 16 | 30.4010 | 4.9300 | 82.52 | 1.49782 | 1.50527 |
| 17 | 166.5003 | 26.6100 | | | |
| 18 | 47.7833 | 4.3000 | 35.51 | 1.59507 | 1.61684 |
| 19 | −99.0920 | 1.8900 | | | |

TABLE 1-continued

| 20 | −31.8820 | 1.5000 | 37.20 | 1.83400 | 1.86275 |
|---|---|---|---|---|---|
| 21 | 31.8903 | 1.8600 | | | |
| 22 | 36.2400 | 5.2500 | 32.17 | 1.67270 | 1.60990 |
| 23 | −261.8493 | (Bf) | | | |

(Variable Interval Upon Zooming)

| f | 72.16569 | 290.04827 |
|---|---|---|
| d6 | 3.34305 | 58.70305 |
| d12 | 29.81407 | 3.00407 |
| d15 | 30.25171 | 1.69171 |
| Bf | 53.0155 | 81.5938 |

(Condition Corresponding Values)

fW = 72.17
fT = 290.05
f1 = 140.000
f2 = −31.047
f3 = 78.957
f4 = 111.709
R31 = 94.3757
L = 8.47
D = 27.0
(1) $f3/(fW \cdot fT)^{1/2}$ = 0.546
(2) f3/f4 = 0.707
(3) ΔS3/f3 = 0.0076
(4) R31/f3 = 1.1953
(5) L/f3 = 0.107
(6) N+ = 1.58913
(7) ν+ = 61.09
(8) |f2|/f1 = 0.222
(9) q+ = −0.555
(10) ΔS3/D = 0.0222

(Vibration Reduction Data)

|   | Wide-angle End | Telephoto End |
|---|---|---|
| Moving Amount of Third Lens Group in Direction Perpendicular to Optical Axis (mm) | 0.30 | 0.60 (= ΔS3) |
| Moving Amount of Image (mm) | 0.435 | 1.165 |

FIGS. 2A to 2E and FIGS. 3A to 3E are respectively graphs showing aberrations at the wide-angle end and the telephoto end. In these graphs, $F_{NO}$ is the f-number, Y is the image height, D is the d-line ($\lambda$=587.6 nm), and G is the g-line ($\lambda$=435.8 nm). In the graphs showing the astigmatism, a solid curve represents the sagittal image plane, and a broken curve represents the meridional image plane.

As can be seen from these graphs, according to this embodiment, the aberrations are satisfactorily corrected even under vibration reduction. [Second Embodiment]

Figure 4:
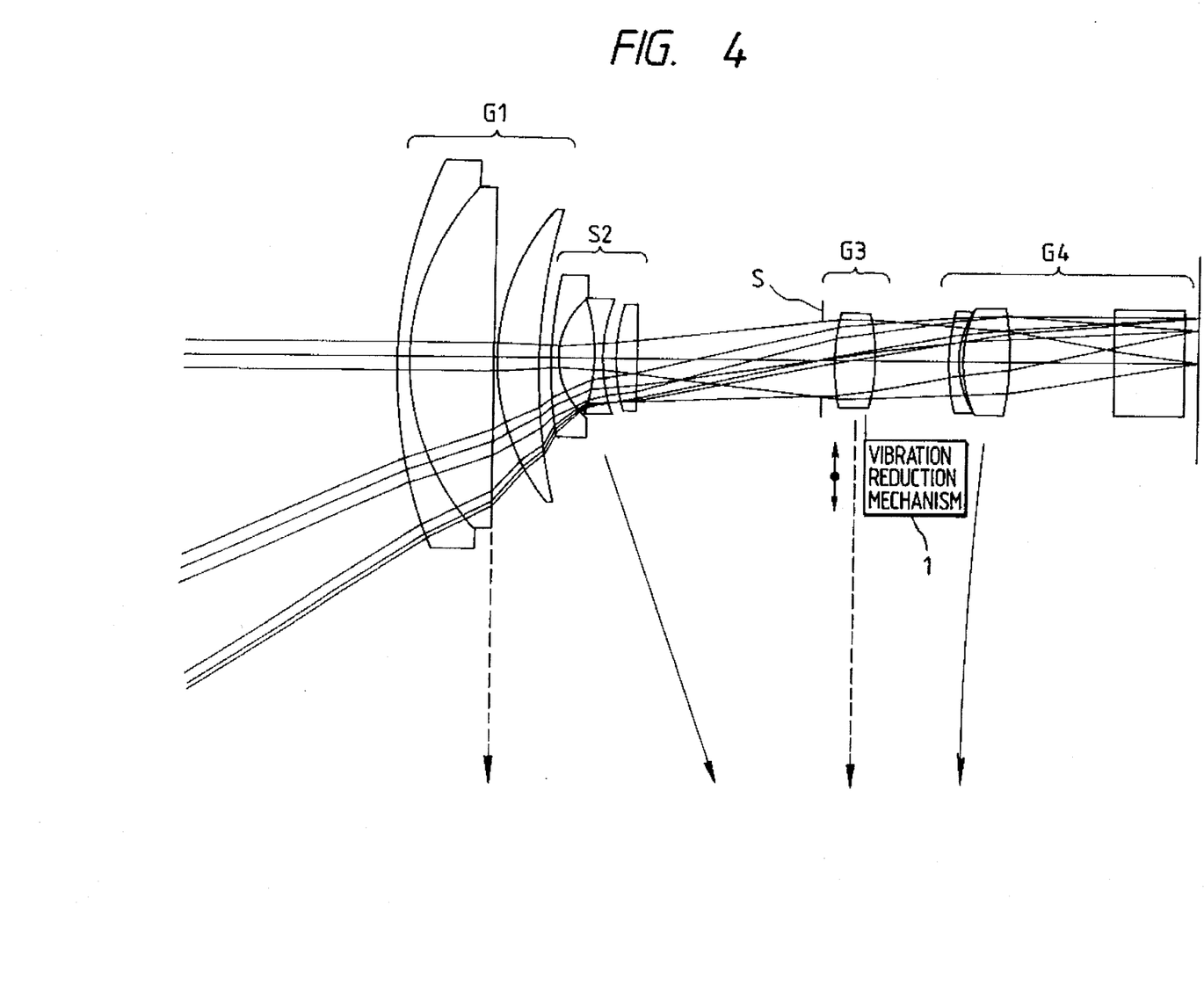
FIG. 4 is a view showing the arrangement of a zoom lens according to a second embodiment of the present invention.
Figures 5A, 5B:
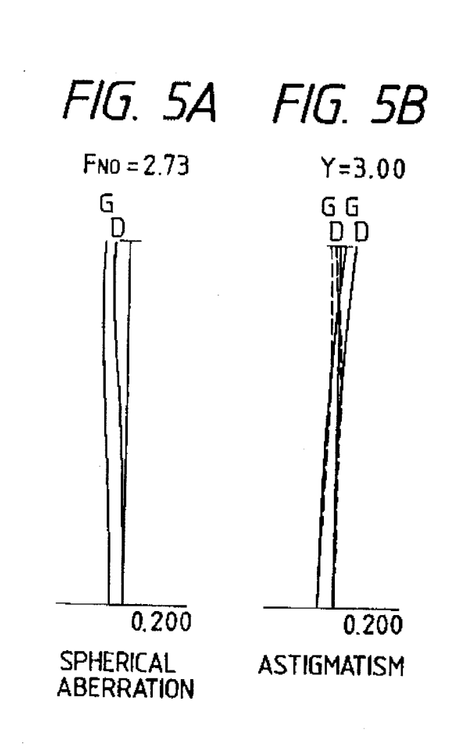
FIGS. 5A to 5E are graphs showing aberrations at the wide-angle end in the second embodiment shown in FIG. 4.
Figure 5C:
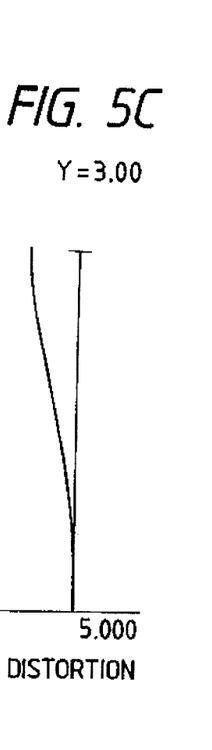
Figure 5D:
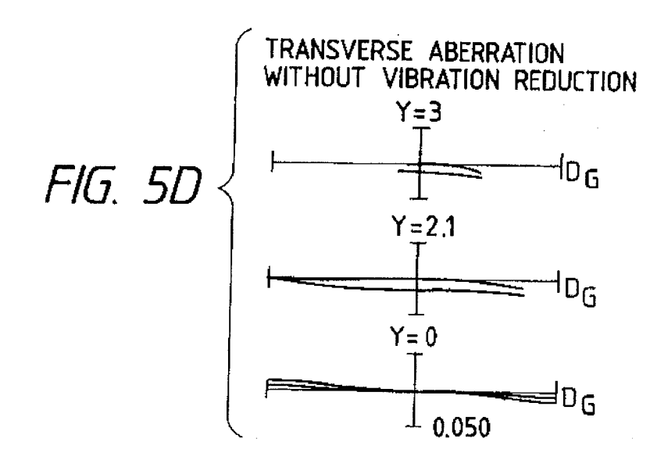
Figure 5E:
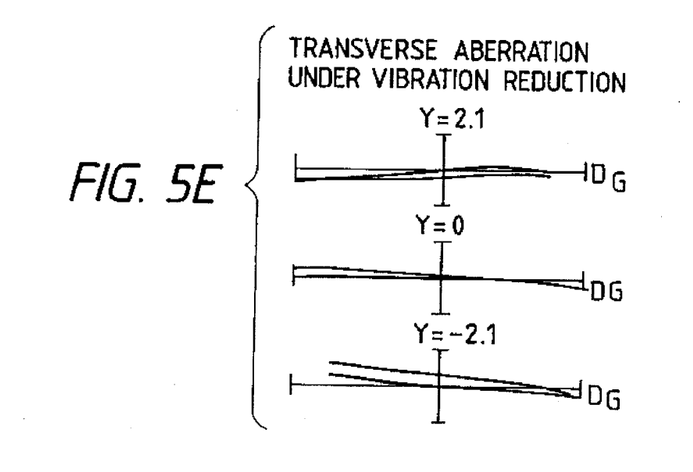
Figure 6A:
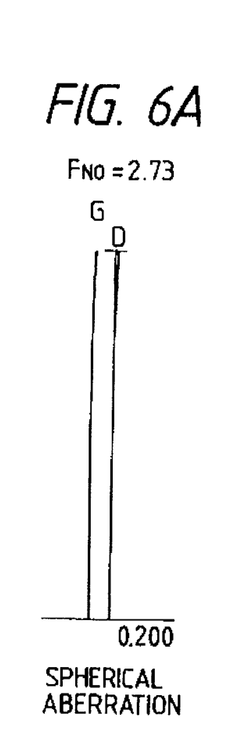
FIGS. 6A to 6E are graphs showing aberrations at the telephoto end in the second embodiment shown in FIG. 4.
Figure 6B:
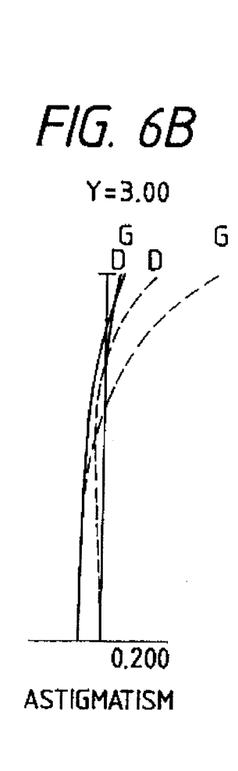
Figure 6C:
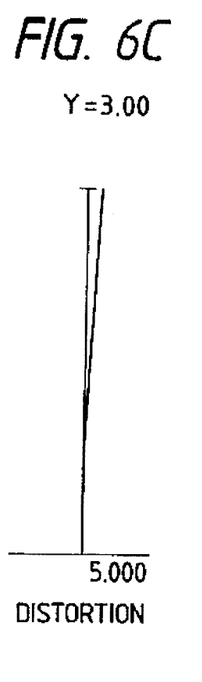
Figure 6D:
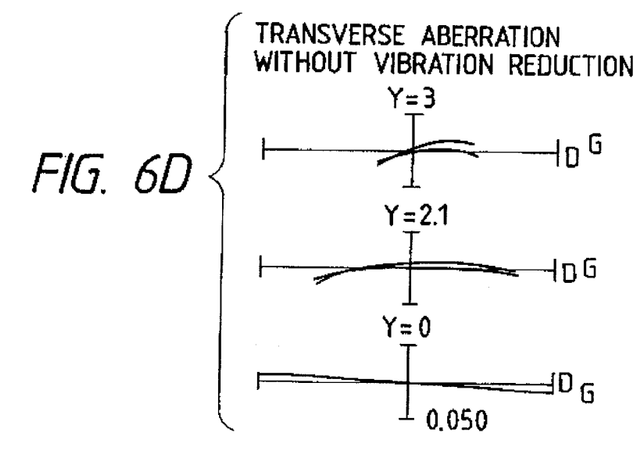
Figure 6E:
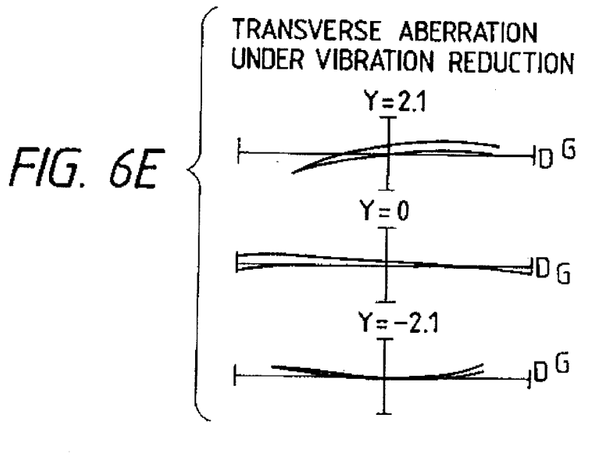

FIG. 4 is a view showing the arrangement of a zoom lens according to the second embodiment of the present invention. The zoom lens shown in FIG. 4 is constituted by, in the following order from the object side: a first lens group G1 consisting of a cemented lens comprising a negative meniscus lens having a convex surface facing the object side and a biconvex lens, and a positive meniscus lens having a convex surface facing the object side; a second lens group G2 consisting of a negative meniscus lens having a convex surface facing the object side, a biconcave lens, and a positive meniscus lens having a convex surface facing the object side; a third lens group G3 consisting of a biconvex lens; and a fourth lens group G4 consisting of a negative meniscus lens having a convex surface facing the object side, a biconvex lens, and a plane-parallel plate.

Note that an aperture stop S is arranged between the second and third lens groups G2 and G3 and in the vicinity of the third lens group G3, as shown in FIG. 4.

FIG. 4 shows the positional relationship among the lens groups at the wide-angle end. Upon zooming toward the telephoto end, the lens groups move along zoom paths indicated by arrows in FIG. 4. Note that the first lens group G1 and the third lens group G3 are fixed along the optical axis during a zooming operation. The third lens group G3 is appropriately shifted by a vibration reduction mechanism 1 as displacement means in a direction substantially perpendicular to the optical axis, thereby correcting an image fluctuation caused by a vibration of the zoom lens.

In the second embodiment, the present invention is applied to a zoom lens for a video camera.

Table 2 below summarizes data values of the second embodiment of the present invention. In Table 2, f is the focal length, $F_{NO}$ is the f-number, $2\omega$ is the field angle, and Bf is the back focus. Furthermore, numerals in the leftmost column represent the order of lens surfaces, r is the radius of curvature of each lens surface, d is the lens surface interval, n (D) and ν are respectively the refractive index and Abbe's number for the d-line ($\lambda$=587.6 nm), and n (G) is the refractive index for the g-line ($\lambda$=435.8 nm).

An aspherical surface is given by the following formula (b):

$$S(y) = (y^2/R)/[1 + (1 - k \cdot y^2/R^2)^{1/2}] + C_2 \cdot y^2 + C_4 \cdot y^4 + C_6 \cdot y^6 + C_8 \cdot y^8 + C_{10} \cdot y^{10} + \ldots \quad (b)$$

where y is the height in a direction perpendicular to the optical axis, S(y) is the displacement amount in the optical axis direction at the height y, R is the reference radius of curvature, k is a coefficient of cone, and $C_n$ is an n-th order coefficient of aspherical surface.

Also, a paraxial radius r of curvature of the aspherical surface is defined by the following formula (c):

$$r = 1/(2 \cdot C_2 + 1/R) \quad (c)$$

An aspherical surface in the data table of this embodiment is indicated by a mark * attached to the left side of the corresponding surface number.

TABLE 2 f = 4.98 to 37.56
$F_{NO}$ = 2.73 to 2.73
$2\omega$ = 64.52° to 9.02°

| | r | d | n(D) | n(G) |
|---|---|---|---|---|
| 1 | 33.6752 | 1.0185 | 25.43 1.80518 | 1.84706 |
| 2 | 17.2554 | 5.6480 | 60.68 1.60311 | 1.61539 |
| 3 | −471.2888 | 0.1850 | | |
| 4 | 14.6464 | 2.9630 | 55.48 1.69680 | 1.71234 |
| 5 | 40.4165 | (d5 = variable) | | |
| 6 | 27.2429 | 0.4630 | 49.68 1.77250 | 1.79193 |
| 7 | 5.2483 | 2.5615 | | |
| 8 | −9.7628 | 0.4630 | 55.48 1.69680 | 1.71234 |
| 9 | 8.3146 | 1.0185 | | |
| 10 | 10.9307 | 1.3890 | 23.88 1.84666 | 1.89381 |
| 11 | 67.3650 | (d11 = variable) | | |
| *12 | 12.7044 | 2.5000 | 59.38 1.58313 | 1.59529 |
| 13 | −27.5350 | (d13 = variable) | | |
| 14 | 12.9379 | 0.4630 | 23.88 1.84666 | 1.89381 |
| 15 | 6.0663 | 0.2870 | | |
| 16 | 6.9707 | 3.4260 | 59.38 1.58313 | 1.59529 |
| *17 | −12.7424 | 6.9500 | | |
| 18 | ∞ | 4.9075 | 64.14 1.51633 | 1.52621 |
| 19 | ∞ | (Bf) | | |

(Variable Interval Upon Zooming)

| | | |
|---|---|---|
| f | 4.97697 | 37.55736 |
| d5 | 0.70000 | 11.77069 |
| d11 | 13.41850 | 2.34781 |
| d13 | 5.30000 | 5.18893 |
| Bf | 0.8859 | 0.9970 |

(Aspherical Surface Data)

| | k | $C_2$ | $C_4$ |
|---|---|---|---|
| 12th Surface | 3.9673 | 0.0000 | $-0.36411 \times 10^{-3}$ |
| | $C_6$ | $C_8$ | $C_{10}$ |
| | $-0.36187 \times 10^{-5}$ | $-0.16171 \times 10^{-6}$ | $0.19847 \times 10^{-8}$ |
| | k | $C_2$ | $C_4$ |
| 17th Surface | 0.8785 | 0.0000 | $-0.31390 \times 10^{-4}$ |
| | $C_6$ | $C_8$ | $C_{10}$ |
| | $-0.51471 \times 10^{-5}$ | $-0.25317 \times 10^{-6}$ | $-0.69516 \times 10^{-9}$ |

(Condition Corresponding Values)

fW = 4.98
fT = 37.56
f1 = 22.806
f2 = −4.627
f3 = 15.257
f4 = 17.569
R31 = 12.7044
L = 2.5
D = 6.0
(1) $f3/(fW \cdot fT)^{1/2}$ = 1.116
(2) f3/f4 = 0.868
(3) ΔS3/f3 = 0.013
(4) R31/f3 = 0.833
(5) L/f3 = 0.164
(6) N+ = 1.58313
(7) ν+ = 59.38
(8) |f2|/f1 = 0.203
(9) q+ = 0.369
(10) ΔS3/D = 0.0333

(Vibration Reduction Data)

| | Wide-angle End | Telephoto End |
|---|---|---|
| Moving Amount of Third Lens Group in Direction Perpendicular to Optical Axis (mm) | 0.20 (= ΔS3) | 0.20 (= ΔS3) |
| Moving Amount of Image (mm) | 0.190 | 0.190 |

FIGS. 5A to 5E and FIGS. 6A to 6E are respectively graphs showing aberrations at the wide-angle end and the telephoto end. In these graphs, $F_{NO}$ is the f-number, Y is the image height, D is the d-line ($\lambda$=587.6 nm), and G is the g-line ($\lambda$=435.8 nm). In the graphs showing the astigmatism, a solid curve represents the sagittal image plane, and a broken curve represents the meridional image plane.

As can be seen from these graphs, according to this embodiment, the aberrations are satisfactorily corrected even under vibration reduction.

As described above, according to the present invention, a compact, high-performance zoom lens which has a vibration reduction function, and is suitable for a still camera, video camera, and the like, can be provided.

What is claimed is:

1. A zoom lens comprising in the following order from the object side:

a first lens group having a positive refracting power;

a second lens group having a negative refracting power;

a third lens group having a positive refracting power; and a fourth lens group having a positive refracting power; and further comprising:

displacement means for attaining vibration reduction by shifting at least a partial lens group in said third lens group in a direction substantially perpendicular to an optical axis; and a stationary flare stop which is arranged on the optical axis and shields unnecessary rays when said at least a partial lens group in said third lens group shifts in the direction substantially perpendicular to the optical axis for vibration reduction, wherein, when zooming is effected from a wide-angle end to a telephoto end, an interval between said first and second lens groups increases, an interval between said second and third lens groups decreases, and an interval between said third and fourth lens groups changes, and said zoom lens satisfies the following conditions:

$$0.2 < f3/(fW \cdot fT)^{1/2} < 2$$

$$0.15 < |f2|/f1 < 0.5$$

$$-1 < q+ < 1$$

$$\Delta S3/D < 0.1$$

where fW is the focal length of the entire lens system at the wide-angle end, fT is the focal length of the entire lens system at the telephoto end, f3 is the focal length of said third lens group, f1 is the focal length of said first lens group, f2 is the focal length of said second lens group, q+ is the shape factor of a positive lens, at the most object side, in said third lens group, $\Delta S3$ is the maximum displacement amount, in the direction perpendicular to the optical axis, of said at least a partial lens group in said third lens group upon vibration reduction, and D is the effective diameter of a surface, at the most object side, in said third lens group.

* * * * *